United States Patent [19]

Drobish

[11] Patent Number: 5,129,561
[45] Date of Patent: Jul. 14, 1992

[54] METERING DEVICE FOR LIQUIDS HAVING A METERING CHAMBER, A COLLECTING CHAMBER, AND A SEPARATING BAFFLE TO PREVENT INADVERTENT FLOW THEREBETWEEN

[75] Inventor: James L. Drobish, Wyoming, Ohio

[73] Assignee: The Procter & Gamble Company, Cincinnati, Ohio

[21] Appl. No.: 453,563

[22] Filed: Dec. 20, 1989

[51] Int. Cl.⁵ .............................. G01F 11/26
[52] U.S. Cl. ................... 222/455; 222/575
[58] Field of Search ........... 222/424, 478, 498, 424.5, 222/454, 455, 457, 442, 431, 426, 575

[56] References Cited

U.S. PATENT DOCUMENTS

| | | | |
|---|---|---|---|
| 2,519,371 | 8/1950 | Hexter | 222/575 X |
| 2,664,228 | 12/1953 | Radeloff et al. | 222/455 |
| 2,853,213 | 9/1958 | Buehlig | 222/455 |
| 2,896,826 | 7/1959 | Matter | 222/455 |
| 2,909,306 | 10/1959 | Inotay | 222/575 X |
| 3,288,335 | 11/1966 | Steffens et al. | 222/455 |
| 3,347,420 | 10/1967 | Donoghue | 222/129 |
| 4,061,253 | 12/1977 | Rockefeller | 222/442 |
| 4,427,041 | 1/1984 | Coetzee | 141/294 |
| 4,449,651 | 5/1984 | Roder et al. | 222/455 |
| 4,607,762 | 8/1986 | Zulauf et al. | 222/48 |
| 4,614,285 | 9/1986 | Fudalla et al. | 222/454 |
| 4,666,065 | 5/1987 | Ohren | 222/109 |
| 4,763,816 | 8/1988 | Lee | 222/207 |
| 4,764,817 | 8/1988 | Lee | 222/207 |
| 4,811,871 | 3/1989 | Wass et al. | 222/477 |

Primary Examiner—Michael S. Huppert
Assistant Examiner—Kenneth DeRosa
Attorney, Agent, or Firm—Michael E. Hilton; John V. Gorman; Richard C. Witte

[57] ABSTRACT

A metering device for successively dispensing uniform volumes of liquid from a container. The upper portion of the dispensing device is divided into a dispensing passage and a metering chamber by a vertical wall. The lower portion of the dispensing device is undivided forming a collecting chamber, the upper portion of which communicates with both the metering chamber and the dispensing passage. The metering chamber has axially spaced inlet and vent openings connected to the inner area of the liquid container. The metering chamber is partially segregated from the collecting chamber by a baffle protruding from the vertical wall. This baffle insures accurate operation of the dispensing device and reduces its necessary volume and length.

20 Claims, 5 Drawing Sheets

METERING DEVICE FOR LIQUIDS HAVING A METERING CHAMBER, A COLLECTING CHAMBER, AND A SEPARATING BAFFLE TO PREVENT INADVERTENT FLOW THEREBETWEEN

FIELD OF INVENTION

The present invention relates to an improved device for successively dispensing a uniform volume of liquid product from a container and, more particularly, to such a device having improved accuracy and reduced size.

BACKGROUND OF THE INVENTION

Many liquid products are traditionally delivered to the consumer in relatively large containers. These traditional containers require the consumer to manually measure out a specific volume of the liquid product for use. The consumer generally measures out an identical quantity of liquid product each time the product is used. Thus, the consumer is required to successively, manually measure out a uniform volume of liquid product from the container. This manual operation, however is time consuming and messy. Moreover, performing this operation manually frequently results in inaccurate measuring. Since the efficacy of products often depends upon how accurately the liquid product volume is measured, manual measuring risks inaccuracy and failure to obtain optimal efficacy.

U.S. Pat. No. 3,288,335 issued to Steffens et al., on Nov. 29, 1966, discloses a multi-chambered tubular metering device for insertion into the opening of liquid containers. Theoretically, as the container is tipped, a volume of liquid is metered by controlling the venting of air into the container. The container becomes airlocked when the desired volume is metered.

In practice, however, it has been found that there is difficulty ensuring that the container becomes airlocked when the container is tilted at relatively low dispensing angles. At these low angles it is quite possible the container will not become airlocked. This allows liquid to flow continuously from the container. Consequently, the device fails to meter and dispense a uniform volume of liquid.

U.S. Pat. No. 4,449,651 issued to Roder, deceased et al. on May 22, 1984, discloses a metering device with concentric chambers that also operates by controlling the venting of air. A metering device of this configuration is costly and complex to manufacture. In addition, and like the device of Steffens et al., it occupies an excessive volume within the container. This excessive volume is undesirable when marketing liquid products. If the metering device occupies excessive volume within the container, then the container dimensions must be enlarged to house the same amount of liquid product. Enlarging the container increases materials and, consequently, costs.

It is an object of the invention to provide a metering device which will accurately dispense successive uniform doses, without continuously flowing.

It is also an object of the invention to provide a metering device of reduced overall volume for a given uniform liquid product volume.

It is additionally an object of the invention to encourage the end user to tilt the container in a direction which ensures proper operation of the metering device.

It is likewise an object of the invention to accomplish the foregoing while reducing the overall costs involved.

The aforementioned and other objects of the invention will become more apparent hereinafter.

SUMMARY OF THE INVENTION

In accordance with one aspect of the present invention there is provided a tubular metering device for insertion into a liquid product container for successively dispensing substantially uniform volumes of liquid therefrom. The device has a tubular body which defines the exterior limits of the device and includes upper and lower end walls. The upper end wall has a dispensing opening located in it. The tubular body also has a vent opening located therein which provides communication between the interior of the metering device, specifically a metering chamber, and the interior of the container. An axially extending vertical wall divides the upper portion of the interior of the metering device into a metering chamber which is sealed at the top by the upper end wall and a dispensing passage which communicates with the exterior of the device through the dispensing aperture. The vertical wall terminates above the lower end wall of the metering device, leaving an undivided collecting chamber in the bottom portion of the interior of the metering device. The upper end of the collecting chamber is in communication with both the metering chamber and the dispensing passage. A transverse baffle projects from the vertical wall intermediate the metering chamber and the collecting chamber. The baffle blocks off the lower end of the metering chamber except of the portion thereof which is farthest removed from the dispensing passage and prevents the flow of liquid in either direction between the metering and the collecting chambers during the normal course of pouring a previously measured volume from the container.

BRIEF DESCRIPTION OF THE DRAWINGS

While the specification concludes with claims which particularly point out and distinctly claim the subject matter forming the present invention it is believed that the invention will be better understood form the following description of the preferred embodiments taken in conjunction with the accompanying drawings in which:

DESCRIPTION OF THE PREFERRED EMBODIMENT

Figure 1:
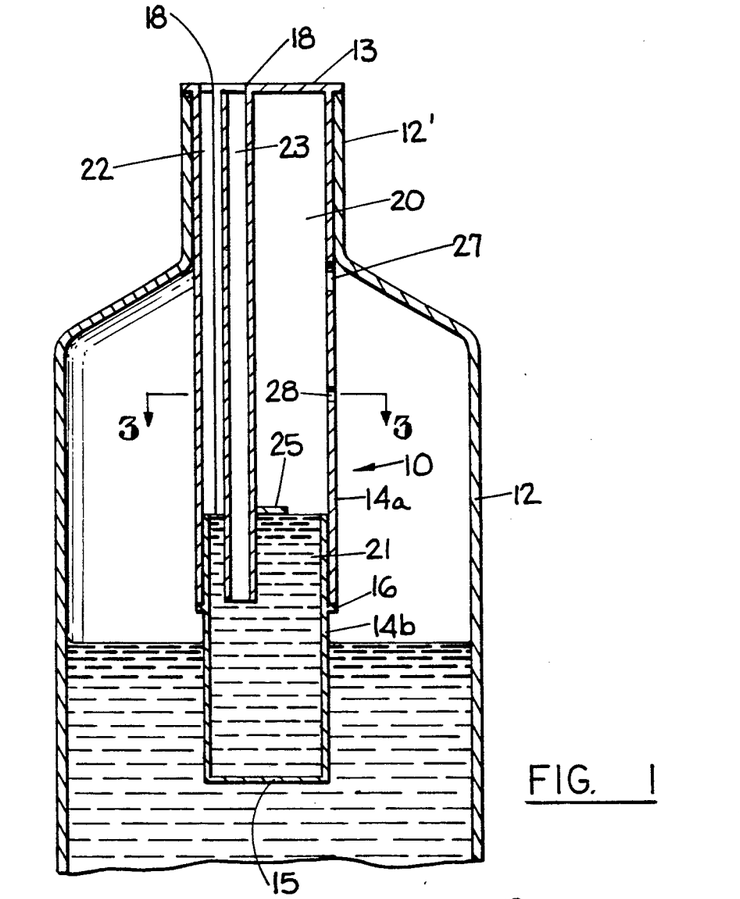
FIG. 1 is a fragmentary vertical section of a container having a metering device of the present invention therein in an upright position ready for dispensing.

Referring to FIG. 1, the present invention provides for a reduced overall height and volume metering device, generally indicated as 10, which eliminates the continuous flow situation and has improved accuracy in dispensing successive uniform volumes of liquid from a container 12. The metering device 10 is a generally tubular bodied insert for insertion in and attachment to the neck 12' of the container 12. The tubular body is preferably formed of two components, an upper segment and a lower segment which is telescoped into the upper segment. Externally, the lower segment consists of the lower end wall 15, a tubular side wall 14b and an external annular ridge 16. Externally, the upper segment includes the upper end wall 13 which has a dispensing opening 17 therein ,a nd a tubular side wall 14a which has an inlet opening 27 and a vent opening 28 therein. These two segments are glued together to form the tubular body. The two segments are used for ease of manufacturing. Each segment is preferably injection molded of polypropylene although other materials, such as polyethylene, polyvinyl chloride, polycarbonate and polystyrene can also be used.

Figure 3:
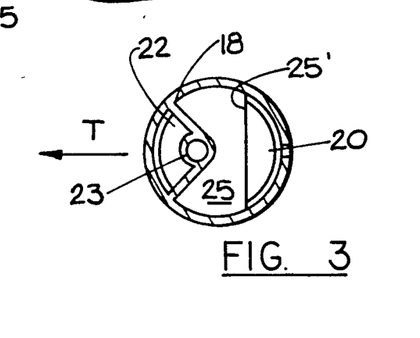
FIG. 3 is a cross-section of the metering device of the present invention taken along line 3—3 of FIG. 1.

As best seen in FIG. 3 in conjunction with FIG. 1, an axially extending vertical wall 18 divides the cross section of the upper portion of the metering device 10 into a large metering chamber 20 and a relatively small dispensing passage 22. The vertical wall 18 of the preferred embodiment is "V" shaped in horizontal section. The "V" shape allows for the simple placement of an air tube 23 at the base of the "V". The air tube 23 extends at its lower end axially beyond the dividing wall 18 to better vent the collecting chamber 21 during dispensing. The lower end of the air tube 23 terminates in the collecting chamber 21 and the other end is generally coplanar with the outer surface of upper end wall 13. The "V" shape also permits a large portion of the cross-sectional area of the metering device 10 to be devoted to the metering chamber 20. This configuration, consequently, reduces the length of the metering chamber 20 necessary to meter a given volume of liquid. Additionally, since the proportion of space utilized for the metering chamber 20 is increased vis-a-vis the dispensing passage 22 and air tube 23, the overall volume of the metering device 10 can be minimized.

The "V" shape of the vertical wall 18 has the added benefit of encouraging proper tipping of the container 12. The visual effect of the "V" shape of the vertical wall 18 and the location and shape of the dispensing opening 17, seen best in FIG. 2, encourages the user to tip the container 12 in the correct direction, i.e., toward the dispensing passage 22. If it is tipped in another direction, the liquid in the collecting chamber 21 has a tendency to flow back into the metering chamber 20 rather than out the dispensing passage 22. This results in less than the full uniform product volume being dispensed.

As FIG. 1 illustrates, the vertical wall 18 terminates above the lower portion of the metering device 10 which portion is, therefore, not interiorly partitioned. Thus, a collecting chamber 21 is formed in the lower, undivided, portion of the metering device 10. This collecting chamber 21 communicates with the metering chamber 20 and the dispensing passage 22 at the right and left sides of its upper end respectively. The metering chamber 20 is partially segregated from the collecting chamber 21 by a transverse baffle 25 projecting horizontally from the lower end of the vertical wall 18 intermediate the metering 20 and collecting 21 chambers.

The baffle 25 is sized so that the liquid product will not flow from the metering chamber 20 into the collecting chamber 21 when the device is moved to any angle "A" from 0° to 90° during a normal pouring cycle. In other words ,the baffle blocks off the lower end of the metering chamber 20 except for the portion thereof farthest removed form the dispensing passage 22. This serves to prevent flow of liquid in either direction between the metering 20 and the collecting 21 chambers during the normal course of pouring a previous measured volume from the container 12. The baffle 25 is sealed along the vertical wall 18 and the interior of the side wall 14a of the tubular body, such that communication between the metering chamber 20 and the collecting chamber 21 is therealong blocked and that the geometric center of the cross-sectional area of the remaining passage therebetween is closer to the back side of the metering device 10 with the baffle 25 than without the baffle 25. The baffle 25 of the preferred embodiment is doubly planar, i.e., the baffle 25 has a flat shape, and is perpendicular to the vertical wall 18. In this embodiment, the baffle 25, as seen in FIG. 3, extends form the vertical wall 18 and has a free peripheral edge 25' which is chord-like and perpendicular to an imaginary line, represented in FIGS. 2 and 3 as the arrow "T", running through the center of the metering device 10 and pointing in the direction of tipping for dispensing.

Figure 2:
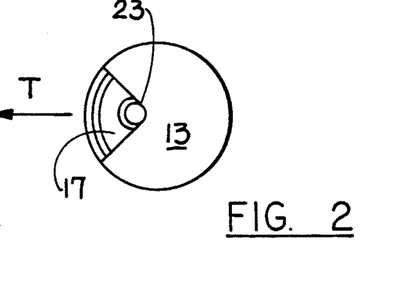
FIG. 2 is a plan view of the metering device of the present invention.

The metering device 10 also has a vent opening 28 and a separate inlet opening 27. Each opening 28 and 27, is located in the tubular outer body and provides access directly to the metering chamber 20 from the interior of the container 12. Preferably openings 27 and 28 are axially aligned and diametrically opposite the center of the dispensing opening 17, so that they lie on the back side of the metering device 10, as far as possible away from the dispensing passage 22. In other words, as shown in FIG. 2, a vertical plane including the arrow T, going through the center of the metering device 10 in the direction of tipping, will also include the axis of each of the opening 27 and 28. In an alternative embodiment (not shown) the vent opening 28 may perform the functions of both opening 27 and 28. The vent opening 28, the inlet opening 27, and the alternative embodiment will be discussed in detail hereinafter.

Figure 4:
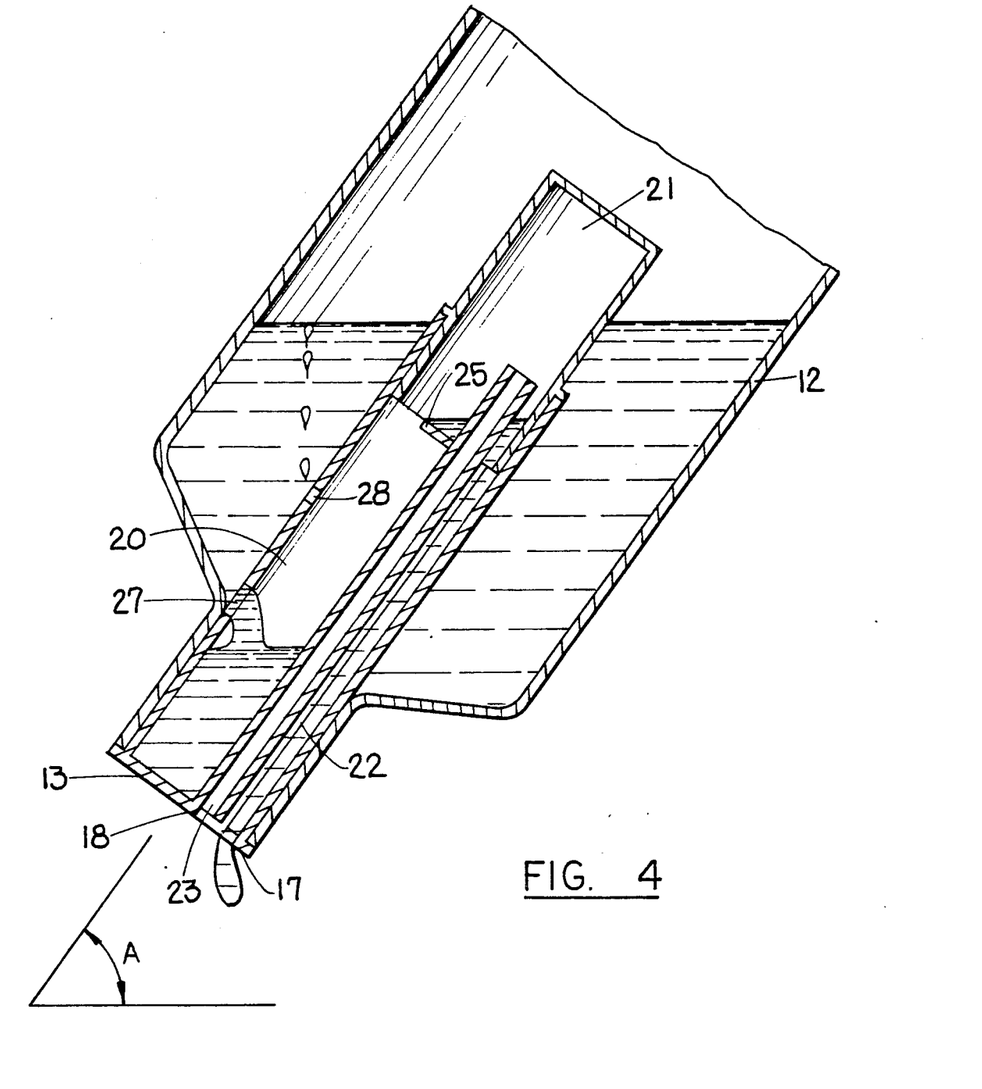
FIG. 4 is a fragmentary vertical section of the container of FIG. 1 illustrating the simultaneous flow of liquid into the metering chamber and out of the collecting chamber of the metering device.

The description of the operation of the metering device 10, begins with the metering device 10 as shown in FIG. 1. The container 12 is in its upright position and a pre-metered liquid product volume is resting int he collecting chamber 21. The user, encouraged by the "V" shape dividing wall 18, tips the container 12 in the direction of the dispensing passage 22. This direction is indicated in FIGS. 2 and 3, by the arrow "T". Referring to FIG. 4, as the container 12 is tipped, the uniform product volume from the collecting chamber 21 flows through the dispensing passage 22 and out the dispensing opening 17. This flow is aided by the ability of air to enter the metering device 10 through the air tube 23.

Figure 5:
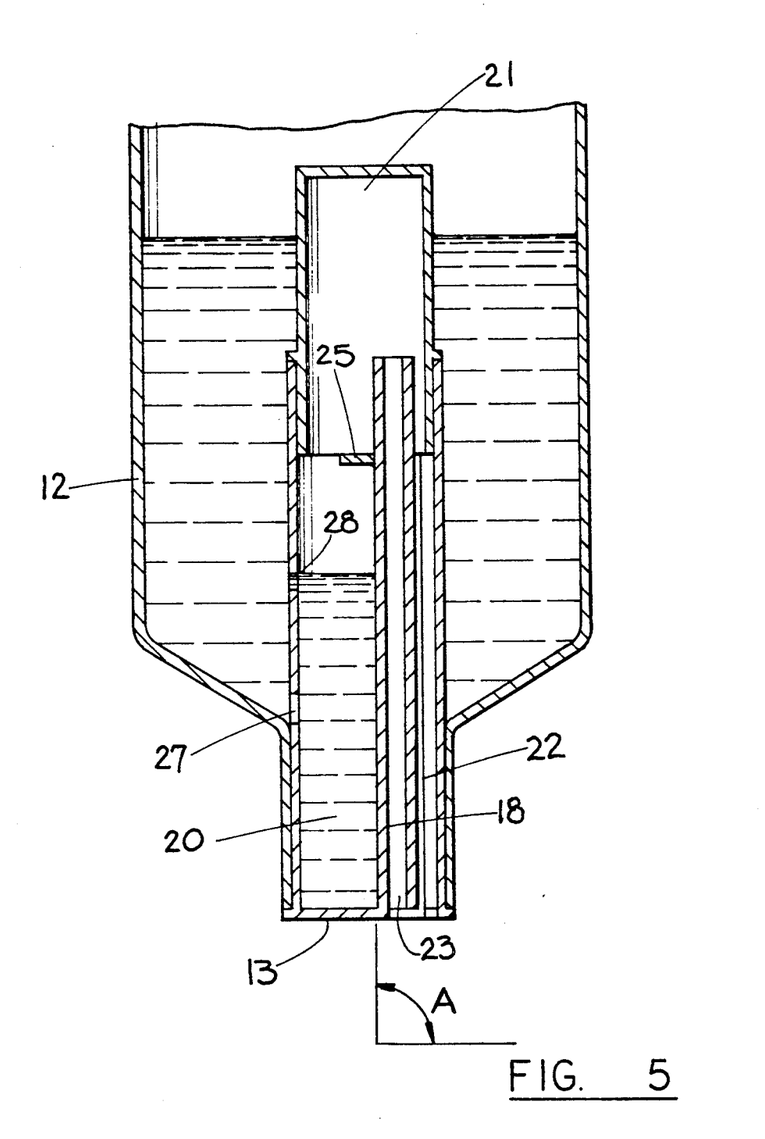
FIG. 5 is a fragmentary vertical section of the container of FIG. 1 in an inverted position.

Simultaneously, liquid from the container 12 flows through the inlet opening 27 and into the metering chamber 20 while air enters the container 12 through the vent opening 28, replacing the liquid. Ideally, the container 12 is tipped until it is, as seen in FIG. 5, completely inverted, (or at least to the same angle "A" relative to the horizontal each time). The flow of air and liquid continues until the liquid level within the metering chamber 20 rises to cover the vent opening 28. At this point, the container 12 is airlocked, i.e., air can no longer enter the container 12. The vent opening 28 is located so the contained 12 air locks when a uniform metered volume is container in the metering chamber 20. As will be discussed below, the device 10 is insured of airlocking because of the baffle 25.

Even after the container 12 is airlocked, however, an excess quantity of liquid flows into the metering chamber 20. The amount of the excess quantity is dependent upon the specific weight of the liquid, the height of the liquid column within the container 12, and the quantity of air within the container 12 subjected to subatmospheric pressure. As the container 12 is returned to its upright position, however, this excess quantity of liquid within the metering chamber 20 over the uniform metered volume, is drawn back into the container 12 form the metering chamber 20 as the air within the container 12 returns to atmospheric pressure. The uniform metered volume remains in the metering chamber 20 to flow into the collecting chamber 21.

Figure 7:
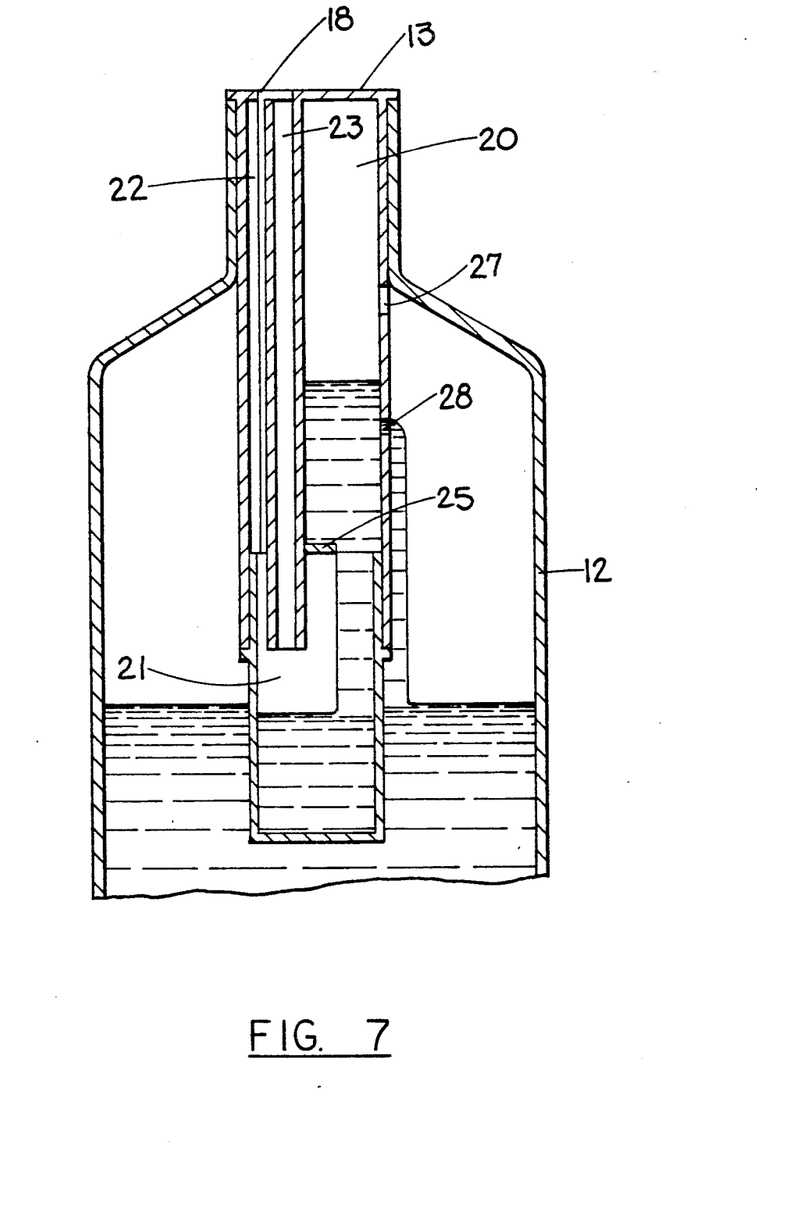
FIG. 7 is a fragmentary vertical section of the container of FIG. 1 illustrating the flow of a measured quantity of liquid from the metering chamber into the collecting chamber of the metering device, following dispensing.

As the container 12 is unrighted, however, not all of the uniformed metered volume flows from the metering chamber 20 into the collecting chamber 21. As seen in FIG. 7, some of the liquid is lost through the inlet opening 27, the vent opening 28, or both as it flows back into the container 12. The remaining liquid which flows into the collecting chamber 21 is the uniform product volume. Thus, the container 12 is returned to its original, FIG. 1, status.

The baffle 25 makes possible the relationship illustrated by the following equation:

$$UPV = UMV - ULV$$

where UPV (uniform product volume is the amount of liquid product dispensed; UMV (uniform metered volume) is the amount of liquid measured in the metering chamber 20; and ULV (uniform lost volume) is the amount of liquid which is lost through the inlet opening 27, the vent opening 28, or both, as the container 12 is unrighted (excluding the excess quantity over the uniform metered volume). The baffle 25 makes all of these quantities, i.e., UPV, UMV and ULV, virtual constants with only minimal deviations when the device 10 is operated normally. The baffle 25 accomplishes this by either eliminating or normalizing various losses and problems which can occur during a cycle of operation, thereby making the above equation possible. The baffle 25 eliminates the continuous flow problem described previously and virtually eliminates the problem of liquid flowing back into the metering chamber 20 from the collecting chamber 21. The baffle 25 also normalizes the metered volume and the lost volume. Each of these problems and how the baffle 25 corrects them will be discussed below, in turn.

Figure 6:
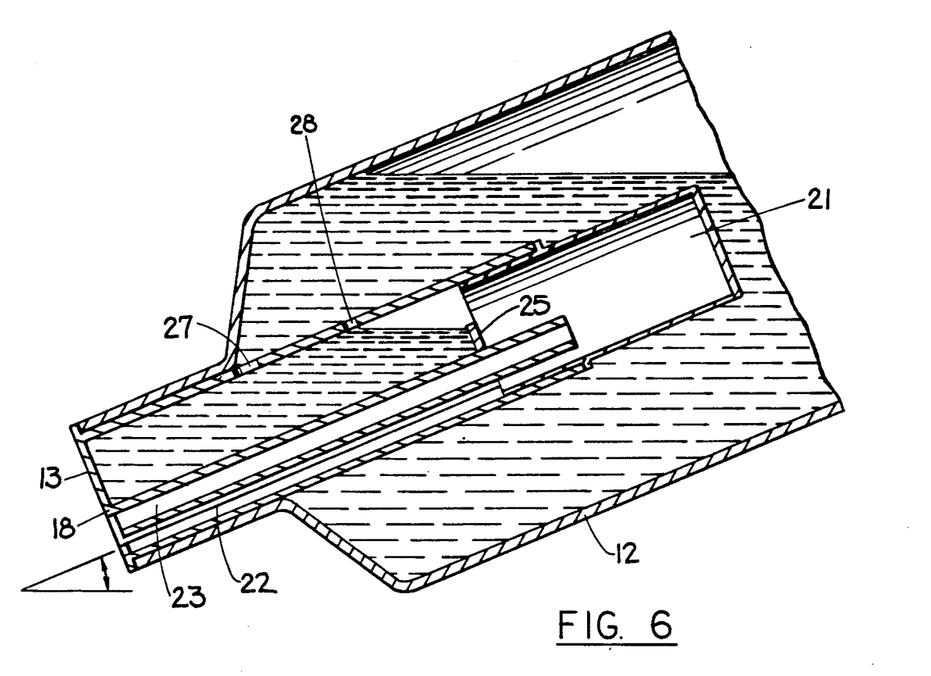
FIG. 6 is a fragmentary vertical section of the container of FIG. 1 in a dispensing orientation.

The baffle 25, eliminates the continuous flow problem. Therefore, liquid will not continuously flow through the metering device 10 when the axis of the metering device 10 is held at relatively small angles in relation to the horizontal. The angle referred to is shown in the Figures as "A" and is the angle between the horizontal plane and the axis of the metering device 10. Without the baffle 25, liquid can flow out of the metering chamber 20, around the end of the vertical wall 18 and out of the metering device 10 when "A" is a relatively small angle. Referring to FIG. 6, without the baffle 25 liquid would continuously flow around the end of the vertical wall 18 if the device is held at the angle "A" shown, without airlocking the container 12. With the baffle 25, as shown, the liquid level must rise above the baffle 25 before it can flow out of the metering chamber 20. Logically, it would seem there should be some angle "A" at which continuous flow will occur over the baffle 25. Continuous flow, however, does not occur in the metering device 10 with the baffle 25, at any angle between 0° to 90°. Thus, with the baffle 25 liquid product will not flow from the metering chamber 20 into the collecting chamber 21 when the metering device is held at any angle "A" from 0°0 to 90°. Although the reasons for this phenomenon are not completely understood, it is believed that the surface tension effects are such that liquid will not pass when the metering device 10 is tipped for dispensing. It has been found that for a typical mouthwash in a metering device 10 of 21.6 mm diameter, it is preferable that the maximum distance between the free edge 25' of the baffle 25 and the tubular outer body be less than about 5 mm.

The baffle 25 also virtually eliminates the problem of liquid from the collecting chamber 21 flowing back into the metering chamber 20 rather than out the dispensing passage 22. Without the baffle 25, as the container 12 is tilted, some of the liquid from the collecting chamber 21 could easily flow back into the metering chamber 20 instead of only out the dispensing passage 22. Consequently, a full uniform product volume would not be dispensed. The quantity of liquid which would be lost in this manner would vary greatly depending upon how quickly the container 12 is tilted and whether the container 12 is tilted in a direction other than that shown on FIGS. 2 and 3 as "T". The baffle 25 serves as a barrier against this type of loss. Under normal operation, therefore, the baffle 25 virtually eliminates any deviation due to liquid backflowing from the collecting chamber 21 into the metering chamber 20.

Additionally, the baffle 25 normalizes the quantity of liquid actually metered, i.e., the metered volume. There is a certain amount of deviation in the angle "A" at which different individuals will terminate tilting of the container 12 when they are dispensing product from the container 12. Since the deviation in the angle "A" results in a deviation in the angle of the surface of the liquid within the metering chamber 20 as the metering chamber 20 fills, a slightly different quantity of liquid will be metered depending upon the angle used. This can be seen by comparing the quantity of liquid in the metering chamber 20 in FIG. 5 with that in FIG. 6.

Referring to FIG. 6, without a baffle 25 the vertical wall 18 would need to be extended to prevent continuous flow at the angle "A" shown. Thus, without the baffle 25, this variable volume has a rather large triangular vertical-sectional area defined by corners at the vent opening 28, the tip of the extended vertical wall and a point on the vertical wall 18 diametrically opposite the vent opening 28. When a baffle 25 is used, such vertical-sectional area is reduced because the tip of the triangle along the extended vertical wall is cut off, leaving a smaller volume with a trapezoidal cross-sectional area for deviation. Thus, the possible deviation which can occur in the metering operation is reduced.

This deviation can be further reduced because it has been found that the angle "A" at which people terminate tilting of the container 12 is largely dependent upon the size of the vessel the liquid is being dispensed into. If a small vessel is being dispensed into, a relatively small angle is generally used while a larger vessel encourages a larger angle. The average angle people use for particular application can be determined and taken into account when locating the vent opening 28 which further reduces the inaccuracy of the metered volume.

The baffle 25, having dealt with the above-discussed problems, creates a situation where the only volume lost flows from the metering chamber 20 through the inlet opening 27 or the vent opening 28, or both, as the container 12 is returned to its upright position. In addition, the baffle 25 normalizes the quantity of the uniform lost volume, such that it is a virtual constant with only minor deviations. The uniform lost volume is equal to the rate of flow through the vent opening 28 multiplied by the time liquid flows through the vent opening 28 plus the rate of flow through the inlet opening 27 multiplied by the time liquid flows through the inlet opening 27. Although the uniform lost volume can occur through the inlet opening 27, the vent opening 28 or both, the bulk of the uniform lost volume of the metering device 10 flows through the vent opening 28. Thus, uniform lost volume generally equals the rate of flow through the vent opening 28 multiplied by the time liquid flows through the vent opening 28. The rate of flow is dependent upon the size of the vent opening 28 and is, therefore, constant since head is only a minimal factor in this device 10.

Without the baffle 25, variation occurs because the amount of time liquid flows through the vent opening 28 is dependent upon the speed at which the container 12 is unrighted. If the container 12 is unrighted quickly, the amount of time liquid contacts the tubular wall 14a near the vent opening 28 is increased, and thus, the quantity of the lost volume is increased. A reduction in the rate of uprighting the container 12 will result in a corresponding reduction in amount of time and a corresponding reduction in the lost volume.

With the baffle 25, the amount of time liquid covers the vent opening 28 is normalized. The baffle 25 constricts the flow of liquid from the metering chamber 20 into the collecting chamber 21 as the container 12 is unrighted. Therefore, as seen in FIG. 7, a backup of liquid occurs as the liquid in the metering chamber 20 must wait to pass into the collecting chamber 20, due to the baffle 25. This backup of liquid can be thought of as a column of liquid in the metering chamber 20. The column continuously grows shorter as the liquid flows form the metering chamber 20 into the collecting chamber 21. The location of the vent opening 28 in relation to the baffle 25 and the rate at which liquid flows around the baffle 25 determines the amount of time the column height is above the vent opening 28 and liquid is lost through the vent opening 28. This amount of time is virtually constant regardless of whether the container is unrighted relatively quickly or relatively slowly in normal operation.

It should be apparent from the foregoing that the baffle 25 eliminates many problems in the metering device 10, enabling accurate metering from use to use. It is also important in many instances to maintain the overall volume of the metering device 10 as small as possible. The smaller the quantity of lost volume, the smaller the overall volume of the metering device 10 since the length of the metering chamber 20 can be reduced. The quantity of the lost volume is controlled by the size of the vent opening 28 and its location relative to the baffle 25, the size of the inlet opening 27 and its location in relation to the baffle 25, and the rate of flow from the metering chamber 20 to the collecting chamber 21. The greater the losses, the greater the volume of liquid which must be metered and the greater the volume of the metering device 10. The inlet opening 27 is preferably located on the back side of the metering device 10. Location on the back side reduces the quantity of the lost volume because as the container 12 is unrighted, gravity maintains the metered volume of liquid away form the back side and consequently away from the inlet opening 27.

Locating the inlet opening 27 on the side of the tubular body away form the direction of tilting, i.e., the back side, eliminates most of the lost volume through this opening 27. The inlet opening 27 is also preferably large enough that it permits the metering operation to complete, i.e. airlock occurs, before al the liquid can be dispensed from the collecting chamber 21. Otherwise, a full uniform metered volume may not have time to enter the metering chamber 20 before the container 12 is unrighted. Thus, a main function of the inlet opening 27 is to speed the flow of liquid into the metering chamber 20. The inlet opening 27, however, should be only large enough to allow airlock to occur before all the liquid can be dispensed from the collecting chamber 21 through the dispensing passage 22. This is necessary because the larger the inlet opening 27 the larger the quantity of liquid which will be lost through the inlet opening 27. Simultaneously, the smaller the inlet opening 27 the smaller the quantity of liquid lost through the inlet opening 27.

Also, to reduce the quantity of liquid lost through the inlet opening 27, the inlet opening 27 should be located as close to the upper end wall 13 as possible. This location reduce the quantity of liquid which must flow past the inlet opening 27 on its way to the collecting chamber 21 thereby reducing the lost volume through the inlet opening 27. In many instances, however, as illustrated in the preferred embodiment, the inlet opening 27 will be located a distance away form the upper end wall 13 to enable the metering device 10 to occupy the entire cross-sectional area of the container neck 12'. The location of the inlet opening 27 below the container neck 12' enables the outside diameter of the tubular body to be substantially identical to the inside diameter of the container neck 12' throughout the container neck 12'. Consequently, the entire cross-sectional area of the container neck 12' is utilized by the metering device 10 which keeps the overall length of the metering device 10 to a minimum. In either instance, the inlet opening 27 should be located at the uppermost point within the container 27 to which fluid can flow. This allows complete emptying of the container 12. Also, the inlet opening 27 should be located a distance form the upper end wall 13 less than or equal to the distance form the vent opening 28 to the baffle 25. This reduces the amount of lost volume through the inlet opening 27 by drastically reducing the amount of time the liquid is above the inlet opening 27 as the container 12 is unrighted.

The vent opening 27, like the inlet opening 27, should be located on the back side of the metering device 10. Also, like the inlet opening 27, the vent opening 27 is preferably small to reduce the quantity of lost volume through the vent opening 27 but large enough to permit completion of the filling operation before all the liquid can be dispensed from the collecting chamber 21 through the dispensing passage 22. The greater the distance of the vent opening 27 from the baffle 25, the less the lost volume. This is because the amount of time the liquid column height is above the vent opening 28 is reduced. Likewise, however, the closer the vent opening 28 to the baffle 25, the lesser the overall volume of the metering device 10.

The inlet 27 and vent 28 openings are also affected by their interrelationship. In one sense it is desirable to decrease the distance between the openings 27 and 28 because as the container 12 empties, the last several doses to be dispensed will not be complete. To some extent, this can be minimized by adjusting the shape of the container 12 such that there is only a small volume within the container 12 between the two openings 27 and 28. In other words, it is preferable to reduce the volume of the container 12 between the imaginary horizontal planes, one through the inlet opening 27 and one through the vent opening 28. This is preferred because if this volume is large then there will be a gradual reduction in the quantity of liquid dispensed. This reduction occurs because, when the quantity of liquid within the container 12 is less than the volume, between the imaginary horizontal planes, the metering chamber 20 will be unable to fill completely. The greater the volume, the greater the number of times a complete uniform metered volume is not metered. To decrease the distance between the openings 27 and 28, however, since the location of the vent opening 28 is fixed by the metered volume, requires one to increase the distance from the upper wall 13 to the inlet opening 27 which, as has been discussed above, requires a trade-off between overall volume of the metering device 10 and the quantity of the lost volume through the inlet opening 27.

The baffle 25 should be large enough to prevent continuous flow and to reduce the amount of liquid flowing back into the metering chamber 20 for the collecting chamber 21. Likewise, the baffle 25 must be small enough that there is a sufficient passage to permit fairly rapid flow of liquid from the metering chamber 20 into the collecting chamber 21 to reduce the amount of time the liquid level is above the inlet 27 and vent 28 openings and consequently, the amount of lost volume.

Having taken the aforementioned into consideration, the metering device of the preferred embodiment has the following approximate dimensions. Referring to FIGS. 1 and 3, the overall diameter of the upper segment 14a of a metering device 10 is 2.0 cm and the overall length of the metering device 10 is 10.3 cm. The inlet opening 27 has a diameter of 0.47 cm and is located 4.0 cm form the top wall 13. The vent opening 27 has a 0.25 cm diameter and is located 6.0 cm from the top wall 13. The metering chamber 20 has a cross-sectional area of 2.47 cm$^2$ and the dispensing passage 22 has a cross-sectional area of 0.60 cm$^2$. The air tube 23 has an inner diameter of 0.3 cm and a length of 7.6 cm. The vertical wall 18 has a length of 6.35 cm. The baffle 25 blocks off the metering chamber 22 between the vertical wall 18 and the free edge of the baffle 25' requiring the liquid to flow through a passage having a 0.75 cm$^2$ cross-sectional area. This metering device 10 is used to meter 7.0 ml of a liquid having a viscosity of 1 cps.

It is possible to eliminate the inlet opening 27 in an alternative embodiment (not shown) by simply enlarging the vent opening 28. Preferably, the vent opening 28 would be at the uppermost point inside the container 12. In this alternative embodiment the vent opening 28 must be large enough to serve both the inlet 27 and vent 28 opening functions. Consequently, the vent opening 28 must be capable of sustaining two phase flow. In other words, the vent opening 28 must be large enough to permit air to enter the container 12 and liquid to enter the metering chamber 20 relatively quickly. This alternative embodiment may be undesirable because enlarging the vent opening 28, which the metered liquid must flow past as the container 12 is unrighted, can result in an inordinate amount of lost volume. In certain situations, however, if the size of the vent opening 28 is such that alternating flow, occurs, i.e., liquid in and then air out, the lost volume is actually reduced. The lost volume is reduced because, although the vent opening 28 is larger, the amount of time liquid is flowing through the vent opening 28 is reduced because of the alternating condition. Although this is a benefit as far as losses are concerned, it is a detriment with respect to filling the metering chamber 20 with a full uniform metered volume before the uniform product volume is dispensed through the dispensing passage 22.

The function of ht metering device 10 of the present invention as normally operated then, is as follows. Referring first to FIG. 1, the container 12 is in its upright position and a pre-metered uniform product volume is resting in the collecting chamber 21. The user tips the container 12, as shown in FIG. 4, in the direction of the dispensing passage 22. As the container 12 is tipped, the liquid from the collecting chamber 21 flows through the dispensing passage 22 and out the dispensing opening 17. The baffle 25 virtually prevents any of this liquid from flowing from the collecting chamber 21 back into the metering chamber 20.

Simultaneously, liquid from the container 12 flows through the inlet opening 27 and into the metering chamber 20 while air enters the container 12 through the vent opening 28. This flow continues until the liquid level within the metering chamber 20 rises to cover the vent opening 27. At this point the container 12 is airlocked because air can no longer enter the container 12. The vent opening 28 is located so that container 12 airlocks when the uniformed metered volume is contained in the metering chamber 20. The device 10 is ensured of airlocking because the baffle 25 makes continuous flow impossible.

Even after the container 12 is airlocked, however, an excess quantity of liquid flows into the metering chamber 20. As the container 12 is returned to its upright position, this excess quantity of liquid within the metering chamber 20 over the uniform metered volume, is drawn back into the container 12 from the metering chamber 20 as the air within the container 12 returns to atmospheric pressure. In addition, as seen in FIG. 7, the baffle 25 slows the flow of liquid from the metering chamber 20 into the collecting chamber 21. This results in a column of water rising above the baffle 25 which allows liquid to pass into the container 12 through the vent opening 28. This quantity of liquid is the lost volume and is constant from one operation to another due to the baffle 25. The remainder of the liquid in the metering chamber 20 flows into the collecting chamber 21 returning the container 12 to its original, FIG. 1, status.

It is of course to be understood that the present invention is by no means limited to the particular arrangement shown in the drawings but also comprises any modifications within the scope of the appended claims.

What I claim is:

1. A tubular metering device for insertion into a liquid product container for successively dispensing substantially uniform volumes of liquid from said device comprising:

(a) a tubular body defining the exterior limits of said metering device, said tubular body having upper and lower end walls, said upper end wall having a dispensing opening located therein, said tubular body further having a vent opening located therein providing communication between the interior of said metering device and the interior or said container;

(b) an axially extending vertical wall dividing the upper portion of the interior of said metering device into a metering chamber sealed at the top by said upper end wall and a dispensing passage which communicates with the exterior of said device through said dispensing opening, said vertical wall terminating above said lower end wall of said metering device, leaving an undivided collecting chamber in the bottom portion of the interior of said metering device, said collecting chamber being in communication at its upper end with both said metering chamber and said dispensing passage;

(c) a transverse baffle projecting from said vertical wall intermediate said metering chamber and said collecting chamber, said baffle blocking off the lower end of said metering chamber, except for the portion thereof furthest removed form the dispensing passage, and serving to prevent flow of said liquid in either direction between the metering and the collecting chambers during the normal course of pouring a previously measured volume from the container.

2. A tubular metering device according to claim 1 wherein said tubular body comprises an upper segment including the upper end wall and a lower segment including the lower end wall, said lower segment being telescopes into said upper segment.

3. A tubular metering device according to claim 1 wherein said vent opening is located on said metering device diametrically opposite the center of said dispensing opening and as far away as possible form said dispensing passage and thereby being away form the direction of tilting.

4. A tubular metering device according to claim 2 wherein said vent opening is located on said metering device diametrically opposite the center of said dispensing opening and as far away as possible form said dispensing passage and thereby being away form the direction of tilting.

5. A tubular metering device according to claim 1, said device further comprising an inlet opening located axially above said vent opening in said tubular body providing communication between the metering chamber int he interior of said metering device and the interior of said container.

6. A tubular metering device according to claim 3, said device further comprising an inlet opening located axially above said vent opening in said tubular body providing communication between the metering chamber int he interior of said metering device and the interior of said container.

7. A tubular metering device according to claim 4, said device further comprising an inlet opening located axially above said vent opening in said tubular body providing communication between the metering chamber int he interior of said metering device and the interior of said container.

8. A tubular metering device according to claim 1, wherein said baffle is doubly planar.

9. A tubular metering device according to claim 6, wherein said baffle is doubly planar.

10. A tubular metering device according to claim 7, wherein said baffle is doubly planar.

11. A tubular metering device according to claim 1, said device further comprising an air tube attached to said vertical wall, one end of said air tube terminating in said collecting chamber and the other end being generally coplanar with said upper end wall.

12. A tubular metering device according to claim 3, said device further comprising an air tube attached to said vertical wall, one end terminating in said collecting chamber and the other end being generally coplanar with said upper end wall.

13. A tubular metering device according to claim 6, said device further comprising an air tube attached to said vertical wall, one end terminating in said collecting chamber and the other end being generally coplanar with said upper end wall.

14. A tubular metering device according to claim 7, said device further comprising an air tube attached to said vertical wall, one end terminating in said collecting chamber and the other end being generally coplanar with said upper end wall.

15. A tubular metering device according to claim 11, wherein said vertical dividing wall has a "V" shaped cross-sectional area.

16. A tubular metering device according to claim 13 wherein said vertical dividing wall has a "V" shaped cross-sectional area.

17. A tubular metering device according to claim 14 wherein said vertical dividing wall has a "V" shaped cross-sectional area.

18. A tubular metering device according to claim 15 wherein said baffle is doubly planar.

19. A tubular metering device according to claim 16 wherein said baffle is doubly planar.

20. A tubular metering device according to claim 17 wherein said baffle is doubly planar.

* * * * *